US011610294B2

(12) United States Patent
Dewitt et al.

(10) Patent No.: US 11,610,294 B2
(45) Date of Patent: Mar. 21, 2023

(54) PROPENSITY MODEL BASED OPTIMIZATION

(71) Applicant: MX Technologies, Inc., Lehi, UT (US)

(72) Inventors: Brandon Dewitt, Provo, UT (US); Ryan McBride, Lehi, UT (US); Shane Smit, American Fork, UT (US); Josh Bodily, Lehi, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 93 days.

(21) Appl. No.: 17/074,839

(22) Filed: Oct. 20, 2020

(65) Prior Publication Data
US 2021/0035280 A1 Feb. 4, 2021

Related U.S. Application Data

(63) Continuation of application No. 16/128,401, filed on Sep. 11, 2018, now Pat. No. 10,817,997.

(Continued)

(51) Int. Cl.
*G06K 9/00* (2022.01)
*G06T 7/00* (2017.01)
(Continued)

(52) U.S. Cl.
CPC .......... *G06T 7/0002* (2013.01); *G06F 16/583* (2019.01); *G06F 16/5846* (2019.01);
(Continued)

(58) Field of Classification Search
CPC ......... G06T 7/0002; G06T 2207/20081; G06T 2207/20084; G06T 2207/30168;
(Continued)

(56) References Cited

U.S. PATENT DOCUMENTS

| 7,257,246 B1 * | 8/2007 | Brodie | G06Q 20/042 |
| | | | 705/40 |
| 8,688,579 B1 * | 4/2014 | Ethington | G06Q 20/386 |
| | | | 705/42 |

(Continued)

FOREIGN PATENT DOCUMENTS

AU    2019204317    11/2020

OTHER PUBLICATIONS

AU Patent Application 2021200936 Exam Report dated Sep. 20, 2021.

(Continued)

*Primary Examiner* — Xin Jia
(74) *Attorney, Agent, or Firm* — Kunzler Bean & Adamson

(57) ABSTRACT

Apparatuses, systems, methods, and computer program products are presented for a propensity module based optimization. An apparatus comprises a processor and a memory that stores code executable by the processor to receive an electronic submission for a pass/fail interface, identify information from the electronic submission to suggest to a user for entering into an input field for the pass/fail interface prior to submitting the electronic submission to the pass/fail interface to reduce a likelihood that the electronic submission will be rejected at the pass/fail interface, determine the likelihood that the electronic submission will be accepted by the pass/fail interface, and submit the electronic submission to the pass/fail interface in response to the likelihood satisfying a threshold.

20 Claims, 5 Drawing Sheets

Related U.S. Application Data

(60) Provisional application No. 62/556,565, filed on Sep. 11, 2017.

(51) Int. Cl.

| | |
|---|---|
| *G06Q 20/04* | (2012.01) |
| *G06N 20/00* | (2019.01) |
| *G06F 16/583* | (2019.01) |
| *G06Q 20/32* | (2012.01) |
| *G07G 1/00* | (2006.01) |
| *G06V 10/24* | (2022.01) |
| *G06V 30/416* | (2022.01) |
| *G06V 30/10* | (2022.01) |

(52) U.S. Cl.
CPC ............ *G06N 20/00* (2019.01); *G06Q 20/042* (2013.01); *G06Q 20/322* (2013.01); *G06Q 20/3276* (2013.01); *G06V 10/24* (2022.01); *G06V 10/242* (2022.01); *G06V 10/243* (2022.01); *G06V 30/416* (2022.01); *G07G 1/0063* (2013.01); *G07G 1/0081* (2013.01); *G06T 2207/20081* (2013.01); *G06T 2207/20084* (2013.01); *G06T 2207/30168* (2013.01); *G06T 2207/30176* (2013.01); *G06V 30/10* (2022.01)

(58) Field of Classification Search
CPC ......... G06T 2207/30176; G06F 16/583; G06F 16/5846; G06N 20/00; G06Q 20/042; G06Q 20/322; G06Q 20/3276; G06V 10/24; G06V 10/242; G06V 10/243; G06V 30/416; G06V 30/10; G06V 30/146; G07G 1/0063; G07G 1/0081
See application file for complete search history.

(56) References Cited

U.S. PATENT DOCUMENTS

| | | | |
|---|---|---|---|
| 2009/0141962 A1* | 6/2009 | Borgia | G06Q 20/04 |
| | | | 705/30 |
| 2016/0036452 A1 | 2/2016 | Ferriss et al. | |
| 2016/0364527 A1 | 12/2016 | Reicher et al. | |
| 2019/0080448 A1 | 3/2019 | Dewitt et al. | |

OTHER PUBLICATIONS

AU Patent Application 2021200936 Exam Report dated Apr. 20, 2022.
AU Patent Application 2021200936 Exam Report dated Aug. 26, 2022.
CA Patent Application 3,047,570 Office Action, dated Sep. 21, 2020.
CA Patent Application 3,047,570 Office Action, dated Jul. 12, 2021.

\* cited by examiner

PROPENSITY MODEL BASED OPTIMIZATION

CROSS-REFERENCES TO OTHER APPLICATIONS

This application is a continuation of U.S. patent application Ser. No. 16/128,401 entitled "PROPENSITY MODEL BASED OPTIMIZATION" and filed on Sep. 11, 2018, for Brandon Dewitt, et al., which claims the benefit of U.S. Provisional Patent Application No. 62/556,565 entitled "PROPENSITY MODEL BASED OPTIMIZATION" and filed on Sep. 11, 2017, for Brandon Dewitt et al., which is incorporated herein by reference.

FIELD

This invention relates to pass/fail interfaces and more particularly relates to propensity model based optimizations of submissions to pass/fail interfaces.

BACKGROUND

Electronic submissions to an interface may be rejected for failure to meet one or more specifications, qualifications, or the like. However, even failed submissions may incur a cost, count against a quota, or the like.

SUMMARY

Apparatuses are presented for propensity model based optimization. An apparatus, in one embodiment, comprises a processor and a memory that stores code executable by the processor. In some embodiments, code is executable by a processor to receive an electronic submission for a pass/fail interface. In various embodiments, code is executable by a processor to identify information from an electronic submission to suggest to a user for entering into an input field for a pass/fail interface prior to submitting the electronic submission to the pass/fail interface to reduce a likelihood that the electronic submission will be rejected at the pass/fail interface. In further embodiments, code is executable by a processor to determine a likelihood that an electronic submission will be accepted by a pass/fail interface. In certain embodiments, code is executable by a processor to submit an electronic submission to a pass/fail interface in response to a likelihood satisfying a threshold.

Methods are presented for propensity model based organization. A method, in one embodiment, includes receiving an electronic submission for a pass/fail interface. A method, in some embodiments, includes identifying information from an electronic submission to suggest to a user for entering into an input field for a pass/fail interface prior to submitting the electronic submission to the pass/fail interface to reduce a likelihood that the electronic submission will be rejected at the pass/fail interface. A method, in certain embodiments, includes determining a likelihood that an electronic submission will be accepted by a pass/fail interface. In one embodiment, a method includes submitting an electronic submission to a pass/fail interface in response to a likelihood satisfying a threshold.

Other apparatuses are presented for propensity model based organization. An apparatus, in one embodiment, includes means for receiving an electronic submission for a pass/fail interface. In some embodiments, an apparatus includes means for identifying information from an electronic submission to suggest to a user for entering into an input field for a pass/fail interface prior to submitting the electronic submission to the pass/fail interface to reduce a likelihood that the electronic submission will be rejected at the pass/fail interface. An apparatus, in further embodiments, includes means for determining a likelihood that an electronic submission will be accepted by a pass/fail interface. In some embodiments, an apparatus includes means for submitting an electronic submission to a pass/fail interface in response to a likelihood satisfying a threshold.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
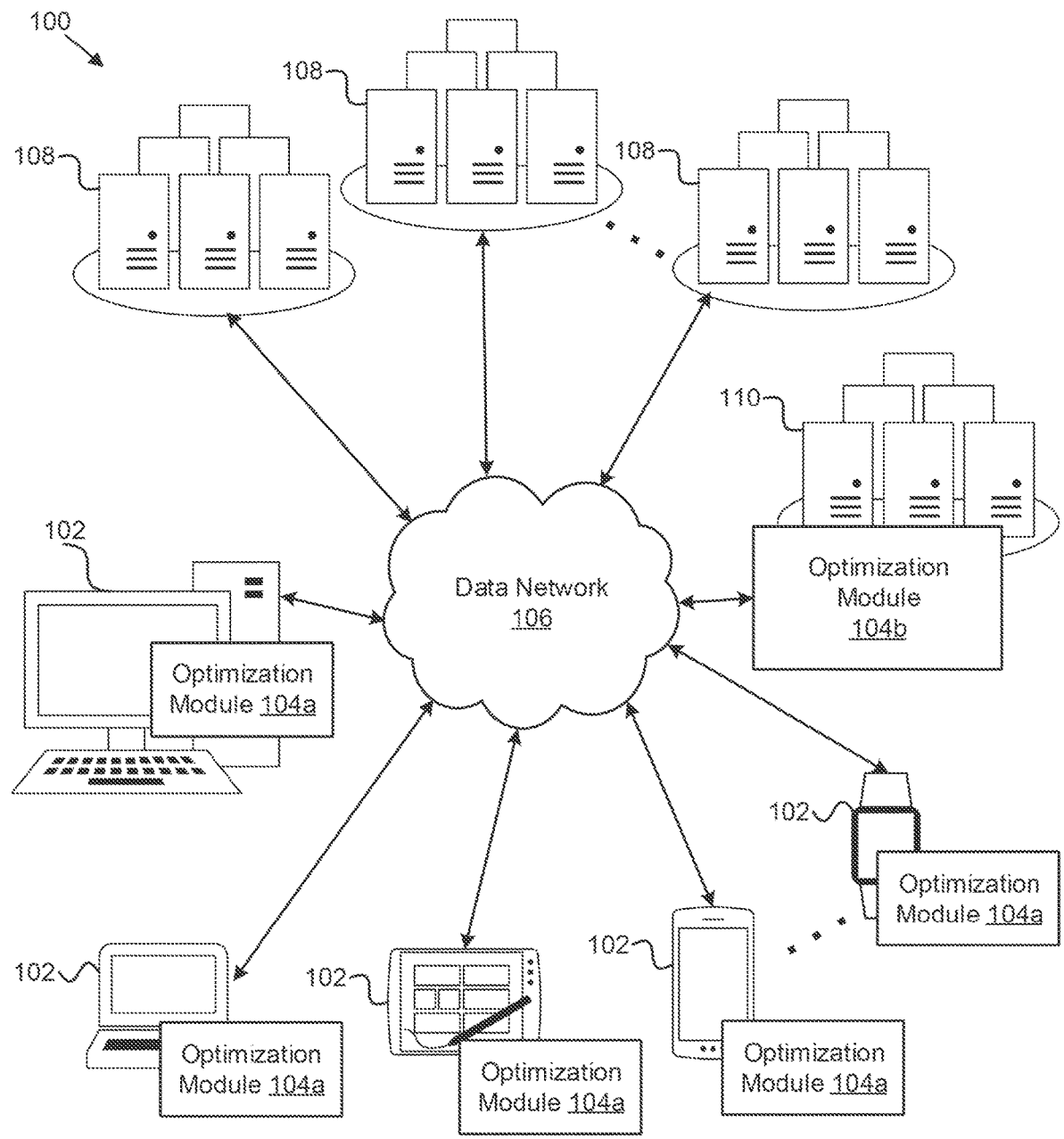
FIG. 1 is a schematic block diagram illustrating one embodiment of a system for propensity model based optimization.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for propensity model based optimization. In one embodiment, the system 100 includes one or more hardware devices 102, one or more optimization modules 104 (e.g., a backend optimization module 104b and/or a plurality of optimization modules 104a disposed on the one or more hardware devices 102), one or more data networks 106 or other communication channels, one or more third party service providers 108 (e.g., one or more servers 108 of one or more service providers 108; one or more cloud or network service providers, or the like), and/or one or more backend servers 110. In certain embodiments, even though a specific number of hardware devices 102, optimization modules 104, data networks 106, third party service providers 108, and/or backend servers 110 are depicted in FIG. 1, one of skill in the art will recognize, in light of this disclosure, that any number of hardware devices 102, optimization modules 104, data networks 106, third party service providers 108, and/or backend servers 110 may be included in the system 100.

In one embodiment, the system 100 includes one or more hardware devices 102. The hardware devices 102 (e.g., computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the hardware devices 102 are in communication with one or more servers 108 of one or more third party service providers 108 and/or one or more backend servers 110 via a data network 106, described below. The hardware devices 102, in a further embodiment, are capable of executing various programs, program code, applications, instructions, functions, or the like.

In various embodiments, the optimization module 104 may use one or more machine learning and/or artificial intelligence functions (e.g., learned functions or the like) to generate one or more propensity models. A propensity model may comprise machine learning, artificial intelligence, a statistical and/or mathematical function, a decision tree, a ruleset, and/or another type of model indicating a likelihood (e.g., predicting) and/or propensity of input data to have and/or yield one or more outcomes. For example, a propensity model may be generated to determine a likelihood or propensity of various types of input data to pass and/or fail when submitted to a pass/fail application programming interface (API) or other function (e.g., a query interface such as a structured query language (SQL) interface, or the like), so that the optimization module 104 may save the cost of submitting data likely to fail to the pass/fail API, may correct data likely to fail before submitting it to the pass/fail API, may request an action of a user to correct data likely to fail, or the like.

Examples of pass/fail APIs, in various embodiments, include a remote deposit capture (RDC) API for depositing checks remotely (e.g., using a camera of a computing device 102 or the like) that either accepts (e.g., passes) or rejects (e.g., fails) one or more images of an uploaded check; a loan application interface that either approves (e.g., passes) or denies (e.g., fails) a loan request in response to submission of a loan application; a diagnostic and/or inspection interface for an electrical and/or mechanical device (e.g., a computing device 102, an automobile or other vehicle that yields a pass and/or fail result; a database interface that either accepts/executes a submitted query or rejects/throws an error; and/or another interface that accepts/rejects, passes/fails, approves/denies, or otherwise provides a binary or two state result.

An optimization module 104, in one embodiment, may train machine learning and/or other artificial intelligence to estimate or otherwise determine a likelihood that an electronic submission to a pass/fail interface will be accepted and/or be rejected by submitting electronic submissions to the pass/fail interface and observing and/or learning from the results over time with different submissions. Machine learning and/or other artificial intelligence, in various embodiments, may include supervised learning (e.g., classification and/or numerical regression, or the like), unsupervised learning, another learned function that improves through experience, clustering, dimensionality reduction, structured prediction, anomaly detection, neural networks (e.g., artificial neural networks, a deep convolutional neural network, or the like), reinforcement learning, decision tree learning, association rule learning, deep learning, inductive logic programming, support vector machines, Bayesian networks, representation learning, similarity and/or metric learning, sparse dictionary learning, genetic algorithms, rule-based machine learning, learning classifier systems, or the like.

For example, in one embodiment, an optimization module 104 may comprise a neural network, such as a deep convolutional neural network, based propensity model trained on previous submissions to a pass/fail interface, which may filter an image/photo multiple times, apply a pixel matrix multiplication and black and white filters, resulting in a value intensity image weighted based on the training of the neural network, or the like, and may determine a likelihood that an electronic submission (e.g., one or more images) will be accepted by a pass/fail interface based on the resulting weighted value intensity images.

In one embodiment, an optimization module 104 may determine one or more pass rates, fail rates, or the like for different inputs, types of inputs, or the like to a pass/fail interface. By learning the behavior of a pass/fail interface, in certain embodiments, an optimization module 104 may mimic or clone one or more functions of an interface locally (e.g., on a hardware device 102), to provide an indication of whether or not data will pass or fail an interface of a third party service provider 108 without submitting the data to the third party service provider 108 (e.g., a remote server 108 or other remote device 108). For example, if each submission to an interface of a third-party service provider 108 incurs a cost or is counted against a quota, an optimization module 104 may reduce incurred costs due to failures by either blocking submission of data likely to fail, correcting data likely to fail, or the like. Determining a likelihood that an electronic submission will pass or fail locally on a hardware computing device 102, in certain embodiments, may be faster than submitting the electronic submission to a pass/fail interface on a remote server 108 of a third-party service provider 108, regardless of whether there is a cost associated with the submission.

In certain embodiments, a control optimization module 104b, or the like, may train machine learning or another artificial intelligence model on an interface to generate a propensity model, and may provide the generated propensity model to one or more device optimization modules 104a on different hardware devices 104a for different users, to dynamically monitor, adjust, and/or correct requests to an interface (e.g., a pass/fail interface of a third party service provider 108, or the like). An optimization module 104 may train a propensity model on actual requests to an interface (e.g., based on data from one or more users), or on training data (e.g., previously received and/or submitted data, artificially created data, or the like).

A propensity model of an optimization module 104, in certain embodiments, may determine when to perform a corrective action on an electronic submission such as suggesting and/or requesting additional information and/or additional action from a user (e.g., missing data, incomplete data, incorrect data, or the like), automatically correcting one or more characteristics of the electronic submission, and/or performing a different corrective action. A corrective action, in one embodiment, according to a trained propensity model, may be an action that increases a likelihood that an electronic submission will be accepted and/or passed by a pass/fail interface (e.g., may change a failed request to a passing request, or the like).

In the RDC example described above, in certain embodiments, a corrective action may comprise retaking one or more images/photos of a check (e.g., at a different angle, with a different background to avoid white on white, with a less complex background, with a different focal length and/or focus to decrease blurriness, swapping incorrectly labeled front and back images/photos, rotating an image/photo, or the like), requesting the user re-enter and/or correct an amount of the check (e.g., based on optical character recognition of a handwritten amount on the check failing to match an amount entered by a user), adding information to an electronic submission, adding a signature to an electronic submission, adding required text (e.g., "for mobile deposit only") to an electronic submission, or the like.

In various embodiments, a propensity model may determine that a money order will fail (e.g., will be rejected by a pass/fail RDC interface for depositing checks), that a blurry or improperly focused image of a check will fail, that an image of a check with a complex background and/or field of capture will fail, that an upside down image of a check will fail, two images of a front or back of a check instead of one of each will fail, an image of a white check on a white background will fail, that a check that is not signed for endorsement will fail, that a check with an amount that doesn't match a user provided amount will fail, or the like.

In certain embodiments, an optimization module 104 may request that a user take an image/photo of a check first, prior to entering information about the check (e.g., a monetary amount or the like), so that the optimization module 104 may determine and suggest the information to the user (e.g., to reduce the possibility of the user entering the wrong information). For example, an optimization module 104 may use optical character recognition to determine an amount for a check and may suggest the determined amount to the user as an option the user may select instead of entering an amount manually.

In the loan application example, in certain embodiments, a propensity model may indicate that an application is likely to be rejected with certain information missing, and an optimization module 104 may request the missing information from a user before submitting the loan application, to avoid and/or reduce a chance of the application being rejected.

For certain predicted failures, an optimization module 104 may correct the electronic submission automatically with little or no input or corrective action from a user. For example, an optimization module 104 may flip an upside-down image, may rotate and/or adjust a rotation of (e.g., de-skew) an image, or the like without requiring a user to retake the image (e.g., correcting the image on the same device 102 the image was taken, prior to submitting the image to a pass/fail interface of a third party service provider 108 or other remote server 108).

In one embodiment, at least an initial pass or determination by an optimization module 104 may comprise an image recognition function with no feature extraction. For example, an optimization module 104 may determine "is the image/photo of a check" without attempting to extract additional information from the check, such as an amount, a routing number, an account number, a check number, a date, or the like. Such a determination may be fast and capable of being performed on any of the hardware devices 102. An optimization module 104, in response to predicting and/or otherwise determining that an image/photo is not of a check, may prompt and/or alert a user that the image/photo does not contain a check, request that a user retake an image/photo, or the like.

An optimization module 104, in some embodiments, may provide an override interface (e.g., a graphical user interface button or the like), allowing a user to submit an electronic submission to a pass/fail interface even if the optimization module 104 has determined that the electronic submission is likely to fail. In other embodiments, an optimization module 104 may block electronic submissions from a pass/fail interface that the optimization module 104 predicts are likely to fail, without the possibility of overriding (e.g., but may suggest and/or perform one or more corrective actions until the optimization module 104 predicts the electronic submission will be acceptable to the pass/fail interface, or the like).

In one embodiment, an optimization module 104 may comprise and/or use multiple tiers of machine learning and/or artificial intelligence, such as multiple series of artificial neural networks, series of series of artificial neural networks, or the like (e.g., with the output of one tier as an input into another tier, or the like). An optimization module 104, in certain embodiments, may dynamically determine which tiers to use to process data, an order for selected tiers, or the like. For example, an optimization module 104 may select and/or order tiers based on a priority or hierarchy, such as by speed (e.g., fastest to slowest or vice versa, only tiers above a speed threshold, or the like), breadth (e.g., broadest to narrowest or vice versa, only tiers above or below a threshold, or the like), or another characteristic. Each tier (e.g., artificial neural network) may perform a different determination (e.g., in the RDC example, one may locate a rectangle, one may determine if the check is upside down, one may determine if the image is blurry, one may locate the amount, or the like).

In one embodiment, an optimization module 104 is configured to determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more third party service providers 108. The optimization module 104, in certain embodiments, accesses a server 108 of a third party service provider 108 using a user's electronic credentials to make an electronic submission to a pass/fail interface of the third party service provider 108, to download data associated with the user from the third party service provider 108, such as a user's photos, a user's social media posts, a user's medical records, a user's financial transaction records or other financial data, and/or other data associated with and/or owned by a user but stored by a server 108 of a third party service provider 108 (e.g., stored by hardware not owned, maintained, and/or controlled by the user). The optimization module 104, in various embodiments, may provide downloaded data to the user locally (e.g., displaying the data on an electronic display of a hardware device 102); may provide the downloaded data from the hardware device 102 of the user to and/or package the data for a remote server 110 (e.g., a backend optimization module 104*b*) or other remote device (e.g., another hardware device 102 of the user, a hardware device 102 of a different user, or the like) which may be unaffiliated with the third party service provider 108; may provide one or more alerts, messages, advertisements, or other communications to the user (e.g., on a hardware device 102) based on the downloaded data; or the like.

In one embodiment, at least a portion of an optimization module 104 may be integrated with or otherwise part of another application executing on a hardware device 102, such as an online banking application and/or a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like), a database client, a photo viewer, a medical application, an insurance application, an accounting application, a social media application, or the like, which may use data the optimization module 104 downloads from a server 108 of a third party service provider 108.

In various embodiments, an optimization module 104 may be embodied as hardware, software, or some combination of hardware and software. In one embodiment, an optimization module 104 may comprise executable program code stored on a non-transitory computer readable storage medium for execution on a processor of a hardware device 102, a backend server 110, or the like. For example, an optimization module 104 may be embodied as executable program code executing on one or more of a hardware device 102, a backend server 110, a combination of one or more of the foregoing, or the like. In such an embodiment, the various modules that perform the operations of an optimization module 104, as described below, may be located on a hardware device 102, a backend server 110, a combination of the two, and/or the like.

In various embodiments, an optimization module 104 may be embodied as a hardware appliance that can be installed or deployed on a backend server 110, on a user's hardware device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a user's hardware device 102. In certain embodiments, an optimization module 104 may comprise a hardware device such as a secure hardware dongle or other hardware appliance device (e.g., a set-top box, a network appliance, or the like) that attaches to another hardware device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of an optimization module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to an optimization module 104.

An optimization module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, an optimization module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of an optimization module 104.

The semiconductor integrated circuit device or other hardware appliance of an optimization module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of an optimization module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more third party service providers 108, in one embodiment, may include one or more network accessible computing systems such as one or more web servers hosting one or more web sites, a database server, an enterprise intranet system, an application server, an application programming interface (API) server, an authentication server, or the like. The one or more third party service providers 108 may include systems related to various institutions or organizations. For example, a third party service provider 108 may include a system providing electronic access to a financial institution, a university, a government agency, a utility company, an email provider, a social media site, a photo sharing site, a video sharing site, a data storage site, a medical provider, or another entity that stores data associated with a user. In one embodiment, a third-party service provider 108 comprises a remote deposit capture service provider that provides a pass/fail interface for remotely depositing checks into deposit accounts for users over the data network 106.

In certain embodiments a third-party service provider 108 may allow users to create user accounts to upload, view, create, and/or modify data associated with the user. Accordingly, a third-party service provider 108 may include an authorization system, such as a login element or page of a web site, application, or similar front-end, where a user can provide credentials, such as a username/password combination, an account number and PIN, or the like to access the user's data.

Figure 2:
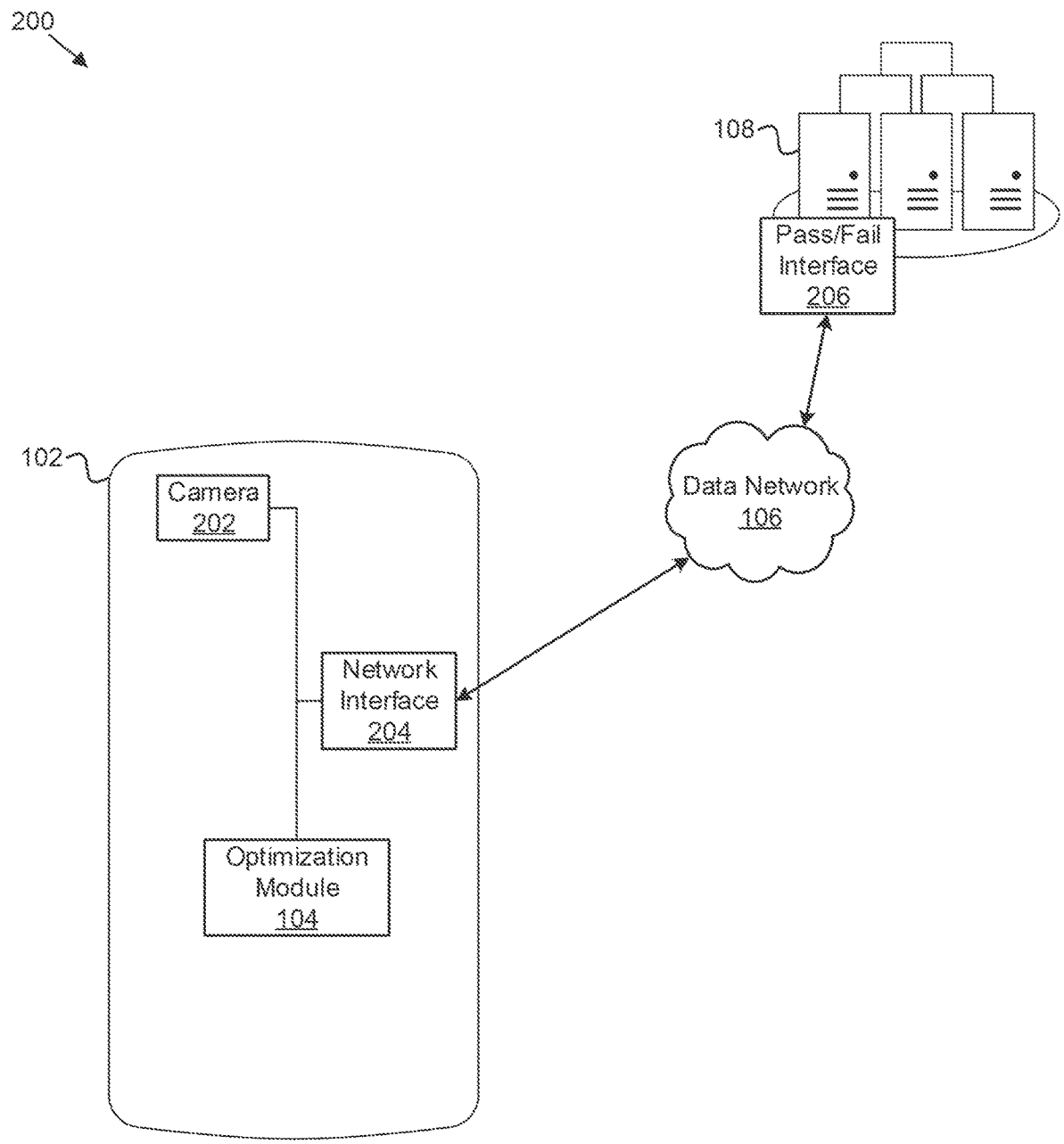
FIG. 2 is a schematic block diagram illustrating a further embodiment of a system for propensity model based optimization.

FIG. 2 depicts one embodiment of a system 200 for propensity model based optimization. In the depicted embodiment, the system 200 includes a mobile computing device 102, a data network 106, and a third-party server 108. The mobile computing device 102, the data network 106, and the third-party server 108, in certain embodiments, may be substantially similar to one or more of the computing devices 102, the data network 106, and/or the third-party servers 108 described above with regard to FIG. 1. The mobile computing device 102, in the depicted embodiment, includes a camera 202, a network interface 204, and an optimization module 104. The third-party server 108, in the depicted embodiment, includes a pass/fail interface 206.

A camera 202, in certain embodiments, may comprise a front facing camera, a read facing camera, or the like of the mobile computing device 102. A user, in certain embodiments, may use a camera 202 of the mobile computing device 102 to take one or more images and/or photos. For example, as part of a remote deposit capture process for depositing a check over the data network 106, the optimization module 104 may prompt a user to take an image/photo of the check using the camera 202 (e.g., an image/photo of the front of the check, an image/photo of the back of the check, or the like). In some embodiments, a camera 202 may comprise a digital camera and the optimization module 104 may store one or more images/photos from the camera 202 in volatile memory and/or non-volatile storage of the mobile computing device 102 (e.g., for submission to the pass/fail interface 206 over the data network 106 using the network interface 204, or the like).

A network interface 204, in certain embodiments, may comprise a wireless transmitter and receiver, transceiver, and/or modem (e.g., for radio frequency, cellular communications, code-division multiple access or other spread spectrum, time division multiple access, Bluetooth®, Wi-Fi®, NFC, and/or other wireless communications). In other embodiments, the network interface 204 may comprise a wired network interface (e.g., a USB interface, an ethernet interface, a serial port, or the like). The network interface 204, in one embodiment, enables digital communication with other devices (e.g., with a backend server 110, a third-party server 108, another computing device 102, or the like) over the data network 106.

An optimization module 104, in certain embodiments, may use the network interface 204 to send electronic submissions over the data network 106 to the pass/fail interface 206. In one embodiment an optimization module 104 sends an electronic submission from a mobile computing device 102 to a pass/fail interface 206 of a third-party service provider 108. In a further embodiment, an optimization module 104 sends an electronic submission from a mobile computing device 102 to a backend optimization module 104 of a backend server 110, and the backend optimization module 104 of the backend server 110 may send the electronic submission to the pass/fail interface 206 of the third-party service provider 108.

A pass/fail interface 206, in certain embodiments, comprises a network interface configured to selectively receive or reject (e.g., pass or fail) electronic submissions. For example, a pass/fail interface 206 may comprise a query language interface of a database system that rejects or otherwise refuses to execute a query with improper formatting or may comprise a remote deposit capture interface that either accepts a check for deposit or rejects it remotely based on one or more submitted images/photos of the check. In certain embodiments, a pass/fail interface 206 may charge a fee, enforce a quota, or the like against a user or other entity associated with an electronic submission whether the pass/fail interface accepts or rejects the electronic submission. As described above, the optimization module 104 may determine a likelihood that an electronic submission will be accepted by the pass/fail interface 206 prior to submitting the electronic submission, and may perform one or more corrective actions on the electronic submission in response to determining that the electronic submission is unlikely to be accepted by the pass/fail interface 206 (e.g., the determined likelihood fails to satisfy a threshold, or the like).

Figure 3:
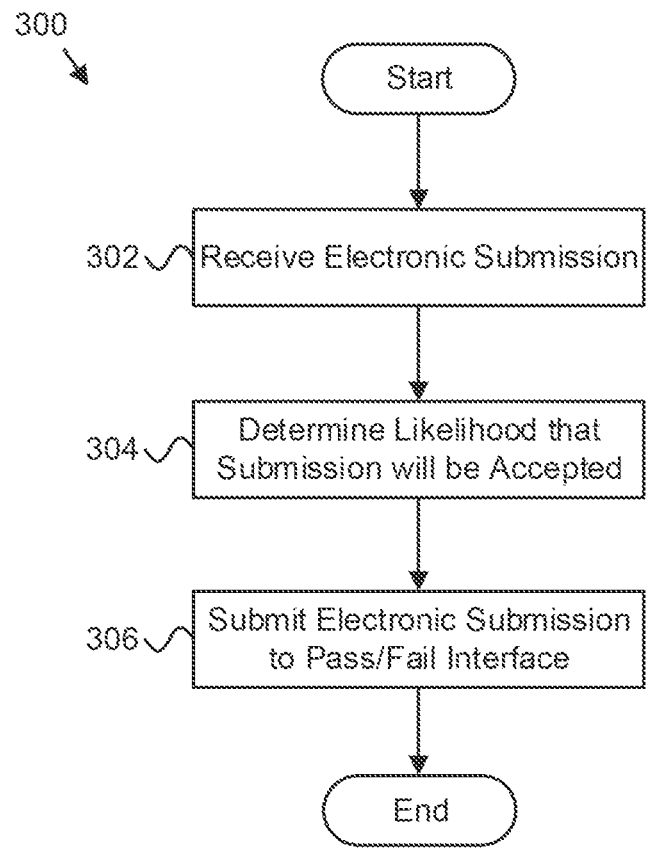
FIG. 3 is a schematic flow chart diagram illustrating one embodiment of a method for propensity model based optimization.

FIG. 3 depicts one embodiment of a method 300 for propensity model based optimization. The method 300 begins, and an optimization module 104 receives 302 an electronic submission. An optimization module 104 determines 304 a likelihood that the received 302 electronic submission will be accepted by a pass/fail interface 206. In response to the determined 304 likelihood that the received 302 electronic submission will be accepted by the pass/fail interface 206 satisfying a threshold, an optimization module 104 submits 306 the received 302 electronic submission to the pass/fail interface 206 and the method 300 ends.

Figure 4:
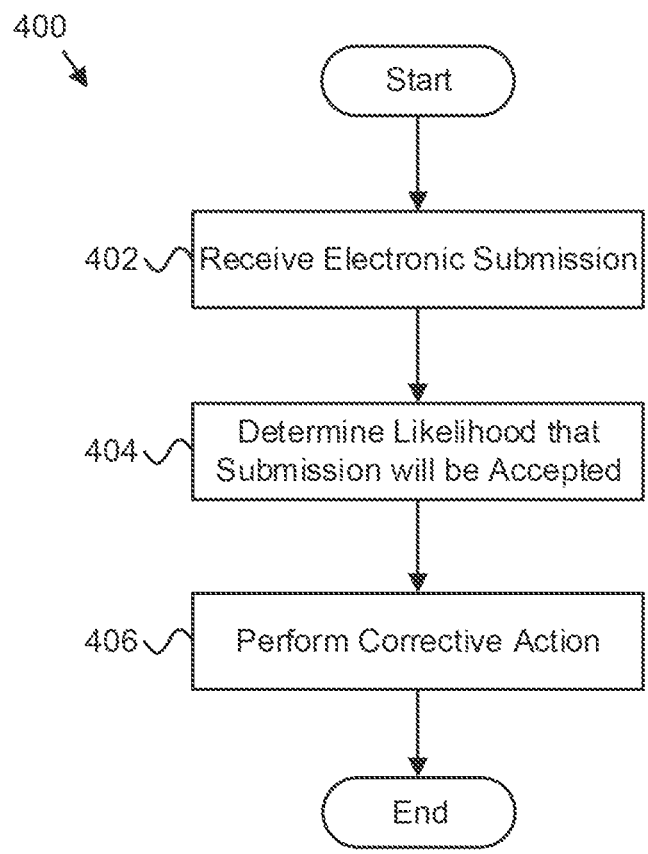
FIG. 4 is a schematic flow chart diagram illustrating a further embodiment of a method for propensity model based optimization.

FIG. 4 depicts one embodiment of a method 400 for propensity model based optimization. The method 400 begins, and an optimization module 104 receives 402 an electronic submission. An optimization module 104 determines 404 a likelihood that the received 402 electronic submission will be accepted by a pass/fail interface 206. In response to the determined 304 likelihood that the received 402 electronic submission will be accepted by the pass/fail interface 206 failing to satisfy a threshold, an optimization module 104 performs 406 a corrective action and the method 400 ends.

Figure 5:
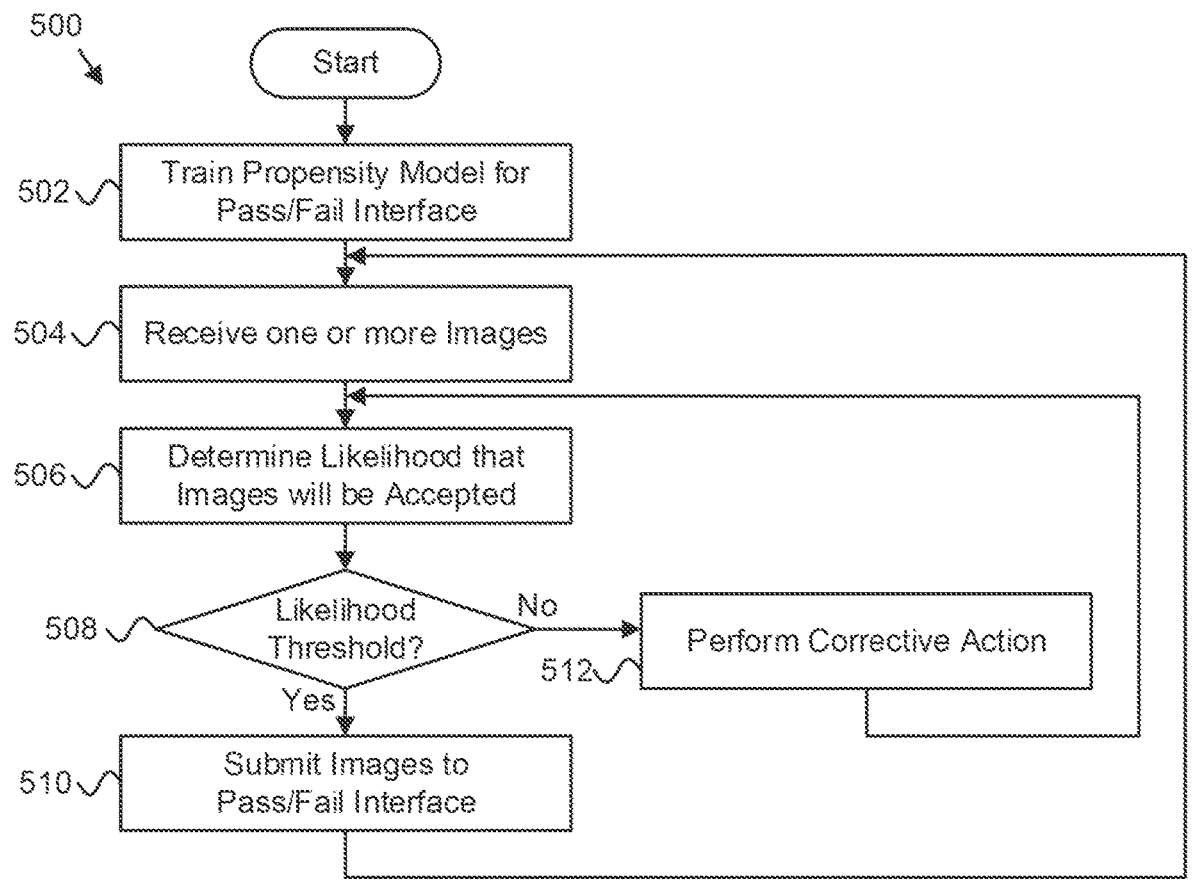
FIG. 5 is a schematic flow chart diagram illustrating an additional embodiment of a method for propensity model based optimization.

FIG. 5 depicts one embodiment of a method 500 for propensity model based optimization. The method 500 begins and an optimization module 104 trains 502 a propensity model for a pass/fail interface 206 (e.g., one or more machine learning models such as neural networks or the like). An optimization module 104 receives 504 one or more images (e.g., an image of a front of a check and a back of the check, or the like). An optimization module 104 determines 506 a likelihood that a pass/fail interface 206 will accept the received 504 one or more images using the trained 502 propensity model.

An optimization module 104 determines 508 whether the likelihood satisfies a threshold. In response to determining 508 that the likelihood fails to satisfy a threshold, an optimization module 104 performs 512 a corrective action (e.g., retaking at least one of the images with a different focal length, retaking at least one of the images with a different background, retaking at least one of the images with a different field of capture, rotating at least one of images, swapping two or more of the images, providing additional information regarding the images, adding a signature to an object of at least one of the images and retaking the image, or the like). In response to performing 512 a corrective action, an optimization module 104 may redetermine 506 a likelihood that a pass/fail interface 206 will accept the corrected 512 one or more images and the method 500 continues.

In response to determining 508 that the likelihood satisfies a threshold, an optimization module 104 submits 510 the one or more images to the pass/fail interface 206. The method 500 continues in response to an optimization module 104 receiving 504 one or more subsequent images (e.g., for a subsequent submission to the pass/fail interface 206, or the like).

A means for determining a likelihood that an electronic submission will be accepted by a pass/fail interface 206, in various embodiments, may include an optimization module 104, a propensity model, a neural network, a machine learning model, artificial intelligence, a processor, an FPGA, an ASIC, a computing device 102, a backend server 110, other logic hardware, and/or other executable code stored on a computer readable storage medium. Other embodiments may include similar or equivalent means for determining a likelihood that an electronic submission will be accepted by a pass/fail interface 206.

A means for submitting an electronic submission to a pass/fail interface 206 in response to a likelihood satisfying a threshold, in various embodiments, may include an optimization module 104, a network interface 204, a data network 106, a processor, an FPGA, an ASIC, a computing device 102, a backend server 110, other logic hardware, and/or other executable code stored on a computer readable storage medium. Other embodiments may include similar or equivalent means for submitting an electronic submission to a pass/fail interface 206 in response to a likelihood satisfying a threshold.

A means for performing a corrective action for an electronic submission in response to a likelihood failing to satisfy a threshold, in various embodiments, may include an optimization module 104, a camera 202, a processor, an FPGA, an ASIC, a computing device 102, a backend server 110, other logic hardware, and/or other executable code stored on a computer readable storage medium. Other embodiments may include similar or equivalent means for performing a corrective action for an electronic submission in response to a likelihood failing to satisfy a threshold.

A means for receiving an electronic submission for a pass/fail interface, in various embodiments, may include an optimization module 104, a processor, an FPGA, an ASIC, a computing device 102, a backend server 110, other logic hardware, and/or other executable code stored on a computer readable storage medium. Other embodiments may include similar or equivalent means for receiving an electronic submission for a pass/fail interface.

A means for identifying information from the electronic submission to suggest to a user for entering into an input field for the pass/fail interface, in various embodiments, may include an optimization module 104, a processor, an FPGA, an ASIC, a computing device 102, a backend server 110, other logic hardware, and/or other executable code stored on a computer readable storage medium. Other embodiments may include similar or equivalent means for identifying information from the electronic submission to suggest to a user for entering into an input field for the pass/fail interface.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    a processor; and
    a memory that stores code executable by the processor to:
        receive an electronic submission for a pass/fail interface from a user;
        identify information from the electronic submission to suggest to the user for entering into an input field for the pass/fail interface prior to submitting the electronic submission to the pass/fail interface to reduce a likelihood that the electronic submission will be rejected at the pass/fail interface, wherein the identified information includes information acquired by optical character recognition;
        present the suggested information to the user as a selectable option that automatically fills in the input field with the suggested information responsive to the user selecting the suggested information;
        determine the likelihood that the electronic submission will be accepted by the pass/fail interface; and
        submit the electronic submission to the pass/fail interface in response to the likelihood satisfying a threshold.

2. The apparatus of claim 1, wherein the information acquired by optical character recognition includes handwritten information of the electronic submission to identify the information to suggest to the user.

3. The apparatus of claim 2, wherein the handwritten information comprises one or more of a monetary amount, a routing number, an account number, a check number, and a date.

4. The apparatus of claim 1, wherein the code is executable by the processor to:
    identify information that is missing from the electronic submission;
    determine that the likelihood that the electronic submission will be accepted with the missing information does not satisfy the threshold; and
    request the missing information from the user prior to submitting the electronic submission.

5. The apparatus of claim 1, wherein the code is executable by the processor to:
    perform a corrective action for the electronic submission in response to the likelihood failing to satisfy the threshold;
    redetermine the likelihood that the electronic submission will pass submission to the pass/fail interface in response to performing the corrective action; and
    submit the electronic submission to the pass/fail interface over a network interface in response to the redetermined likelihood satisfying the threshold.

6. The apparatus of claim 5, wherein the corrective action comprises suggesting, on a mobile computing device, an adjustment to the electronic submission to a user of the mobile computing device.

7. The apparatus of claim 6, wherein the suggestion comprises one or more of:
    retaking at least one image of the electronic submission with a different focal length;
    retaking at least one image of the electronic submission with a different background;
    retaking at least one image of the electronic submission with a different field of capture;
    rotating at least one image of the electronic submission;
    swapping two or more of the at least one image of the electronic submission;
    providing additional information regarding an image of the electronic submission; and
    adding a signature to an object of at least one image of the electronic submission and retaking the at least one image of the electronic submission.

8. The apparatus of claim 7, wherein the corrective action comprises an automatic action correcting one or more characteristics of one image of the electronic submission.

9. The apparatus of claim 8, wherein the automatic action comprises one or more of rotating at least one image of the electronic submission and swapping two or more images of the electronic submission.

10. The apparatus of claim 1, wherein the electronic submission comprises one or more images of a check and the pass/fail interface comprises a remote deposit interface for depositing the check using a network interface.

11. The apparatus of claim 10, wherein the likelihood fails to satisfy the threshold in response to one or more of:
    the check comprising a money order;
    the one or more images of the check satisfying a blurriness threshold;
    a background of the one or more images satisfying a complexity threshold;
    a background of the one or more images satisfying a similarity threshold relative to the check;
    the one or more images having a wrong rotation;
    a front image of the check and a back image of the check being switched in the one or more images;
    a signature endorsement missing from the check; and
    a monetary amount written on the check failing to match a monetary amount input by a user of a mobile computing device.

12. The apparatus of claim 1, further comprising an optimization module that is configured to determine the likelihood using a neural network based propensity model trained on previous submissions to the pass/fail interface.

13. The apparatus of claim 1, wherein the code is executable by the processor to provide an override interface allowing the user to submit the electronic submission to the pass/fail interface even if the likelihood that the electronic submission is accepted does not satisfy the threshold.

14. The apparatus of claim 1, wherein the pass/fail interface is of a server of an additional apparatus.

15. A method, comprising:
receiving an electronic submission for a pass/fail interface from a user;
identifying information from the electronic submission to suggest to the user for entering into an input field for the pass/fail interface prior to submitting the electronic submission to the pass/fail interface to reduce a likelihood that the electronic submission will be rejected at the pass/fail interface, wherein the identified information includes information acquired by optical character recognition;
presenting the suggested information to the user as a selectable option that automatically fills in the input field with the suggested information responsive to the user selecting the suggested information;
determining the likelihood that the electronic submission will be accepted by the pass/fail interface; and
submitting the electronic submission to the pass/fail interface in response to the likelihood satisfying a threshold.

16. The method of claim 15, wherein the information acquired by optical character recognition includes handwritten information of the electronic submission to identify the information to suggest to the user.

17. The method of claim 16, wherein the handwritten information comprises one or more of a monetary amount, a routing number, an account number, a check number, and a date.

18. The method of claim 15, further comprising:
identifying information that is missing from the electronic submission;
determining that the likelihood that the electronic submission will pass with the missing information does not satisfy the threshold; and
requesting the missing information from the user before submitting the electronic submission.

19. The method of claim 15, further comprising receiving the electronic submission from the user through a first apparatus and wherein the pass/fail interface is of a server of a second apparatus.

20. An apparatus, comprising:
means for receiving an electronic submission for a pass/fail interface from a user;
means for identifying information from the electronic submission to suggest to the user for entering into an input field for the pass/fail interface prior to submitting the electronic submission to the pass/fail interface to reduce a likelihood that the electronic submission will be rejected at the pass/fail interface, wherein the identified information includes information acquired by optical character recognition;
means for presenting the suggested information to the user as a selectable option that automatically fills in the input field with the suggested information responsive to the user selecting the suggested information;
means for determining the likelihood that the electronic submission will be accepted by the pass/fail interface; and
means for submitting the electronic submission to the pass/fail interface in response to the likelihood satisfying a threshold.

* * * * *